(12) United States Patent
Meczkowski et al.

(10) Patent No.: US 11,293,703 B2
(45) Date of Patent: Apr. 5, 2022

(54) HEAT EXCHANGERS

(71) Applicants: UTC Aerospace Systems Wroclaw SP. Z O.O., Wroclaw (PL); Hamilton Sundstrand Corporation, Charlotte, NC (US)

(72) Inventors: Tomasz Meczkowski, Kielczow (PL); Hubert Siudzinski, Wroclaw (PL); Jaroslaw Rubalewski, Wroclaw (PL); David Saltzman, Glastonbury, CT (US); Jakub Drzewiecki, Piensk (PL); Joseph Turney, Amston, CT (US); Ryan Matthew Kelley, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/226,973

(22) Filed: Apr. 9, 2021

(65) Prior Publication Data
US 2021/0222966 A1 Jul. 22, 2021

Related U.S. Application Data

(60) Continuation-in-part of application No. 17/176,145, filed on Feb. 15, 2021, which is a continuation of
(Continued)

(51) Int. Cl.
*B23P 15/26* (2006.01)
*F28F 13/08* (2006.01)
(Continued)

(52) U.S. Cl.
CPC .............. *F28F 13/08* (2013.01); *B23P 15/26* (2013.01); *F28D 7/103* (2013.01); *F28D 7/106* (2013.01);
(Continued)

(58) Field of Classification Search
CPC . F28D 7/106; F28D 7/082; F28D 7/10; F28D 7/103; Y10T 29/49384; Y10T 29/4935
See application file for complete search history.

(56) References Cited

U.S. PATENT DOCUMENTS 2,189,704 A * 2/1940 Campbell ............... F04B 39/16
55/500
3,228,464 A * 1/1966 Stein ..................... F28D 9/0012
165/166
(Continued)

FOREIGN PATENT DOCUMENTS

CN  107606982 B   6/2019
DE  102007044980 A1  3/2008
(Continued)

OTHER PUBLICATIONS

Extended Search Report dated May 17, 2017 in connection with EP Publication No. 16207348.
(Continued)

*Primary Examiner* — Jason L Vaughan
*Assistant Examiner* — Amanda Kreiling
(74) *Attorney, Agent, or Firm* — Locke Lord LLP; Scott D. Wofsy; Alicia J. Carroll

(57) ABSTRACT

A counter-flow heat exchanger core includes a first wall defining a longitudinal axis. The first flow path is defined within the first wall. The first flow path includes a primary flow inlet and a primary flow outlet downstream from the primary flow inlet. The heat exchanger core includes at least two hollow vanes circumferentially spaced apart and extending in a radially inward direction from the first wall. Each of the at least two hollow vanes includes a first vane wall and a second vane wall. The heat exchanger core includes a second flow path defined within the at least two hollow vanes between the first vane wall and second vane wall of each of the at least two hollow vanes. The heat exchanger
(Continued)

core includes at least one fin extending between two of the at least two circumferentially spaced apart vanes.

19 Claims, 7 Drawing Sheets

Related U.S. Application Data application No. 16/117,374, filed on Aug. 30, 2018, now Pat. No. 10,921,071, which is a division of application No. 14/993,843, filed on Jan. 12, 2016, now Pat. No. 10,088,250.

(51) Int. Cl.
| | | |
|---|---|---|
| F28D 7/10 | (2006.01) | |
| F28F 1/02 | (2006.01) | |
| F28F 1/06 | (2006.01) | |
| F28F 1/00 | (2006.01) | |

(52) U.S. Cl.
CPC .............. *F28F 1/006* (2013.01); *F28F 1/022* (2013.01); *F28F 1/025* (2013.01); *F28F 1/06* (2013.01); *F28F 2210/02* (2013.01); *Y10T 29/49384* (2015.01)

(56) References Cited

U.S. PATENT DOCUMENTS

| | | | |
|---|---|---|---|
| 3,323,586 A | | 6/1967 | Burne |
| 3,474,513 A | * | 10/1969 | Allingham .............. F28D 7/106 29/890.036 |
| 3,493,041 A | | 2/1970 | Hourwitz et al. |
| 3,818,984 A | * | 6/1974 | Nakamura .............. F28F 3/025 165/166 |
| 4,609,039 A | | 9/1986 | Fushiki et al. |
| 7,496,285 B2 | | 2/2009 | Molavi |
| 8,235,101 B2 | | 8/2012 | Taras et al. |
| 8,289,710 B2 | | 10/2012 | Spearing et al. |
| 10,145,624 B2 | | 12/2018 | Rhee et al. |
| 10,406,601 B2 | | 9/2019 | Martin et al. |
| 10,866,030 B2 | | 12/2020 | Sobolak et al. |
| 2009/0260586 A1 | | 10/2009 | Geskes et al. |
| 2011/0232885 A1 | | 9/2011 | Kaslusky et al. |
| 2012/0285660 A1 | | 11/2012 | Poltorak |
| 2014/0284038 A1 | | 9/2014 | Vedula et al. |
| 2014/0345837 A1 | | 11/2014 | Alahyari et al. |
| 2017/0138670 A1 | | 5/2017 | Penny et al. |
| 2020/0189046 A1 | | 6/2020 | Ravindranath et al. |

FOREIGN PATENT DOCUMENTS

| | | |
|---|---|---|
| FR | 2395480 A2 | 1/1979 |
| GB | 1032990 A | 6/1966 |
| GB | 2521913 A | 7/2015 |

OTHER PUBLICATIONS

Extended European Search Report dated Nov. 27, 2018, issued during the prosecution of corresponding European Patent Application No. EP 18191192.6 (12 pages).

* cited by examiner

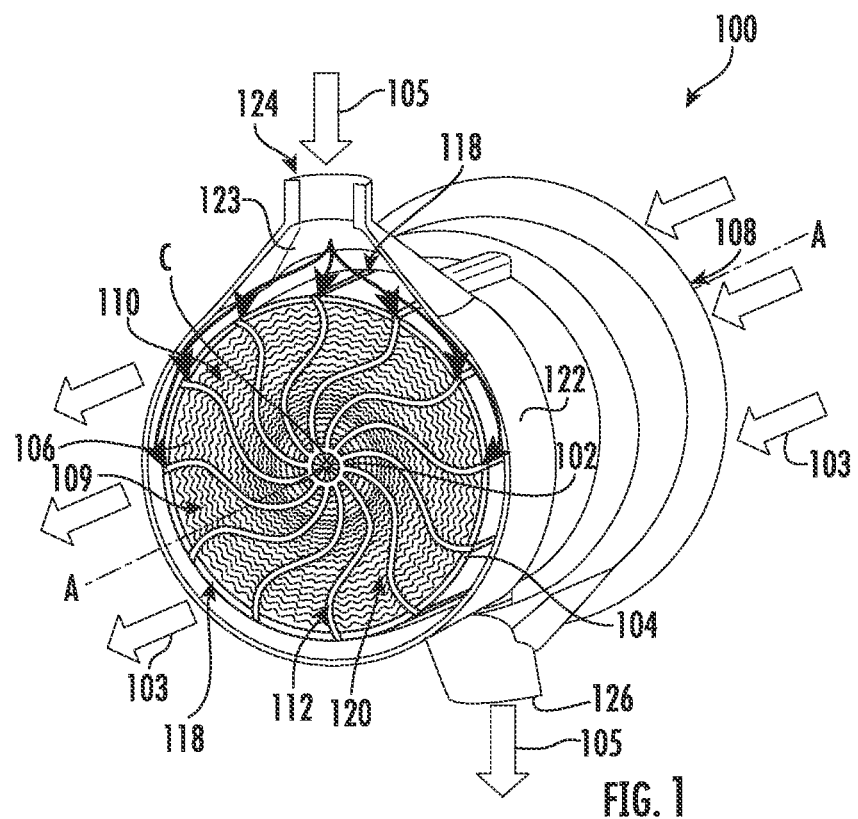
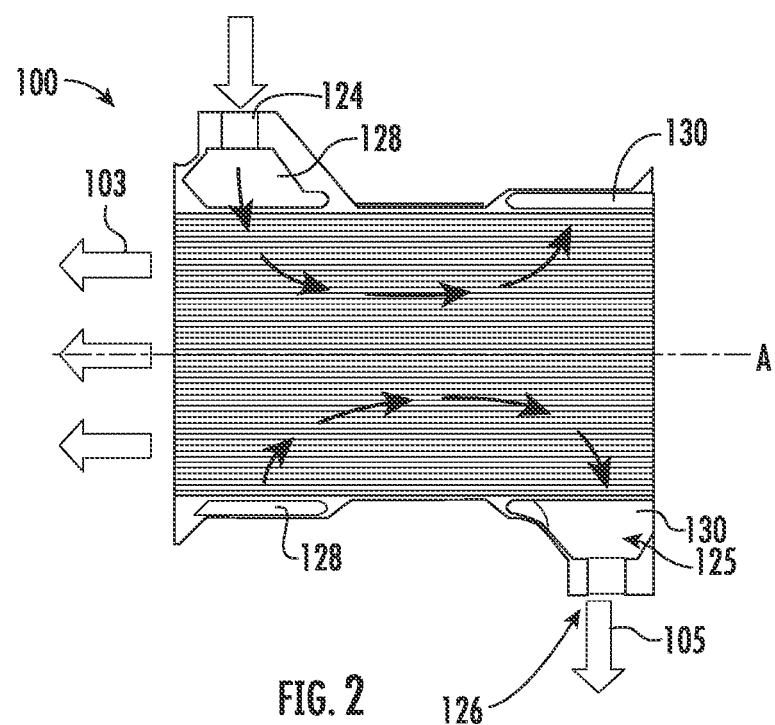

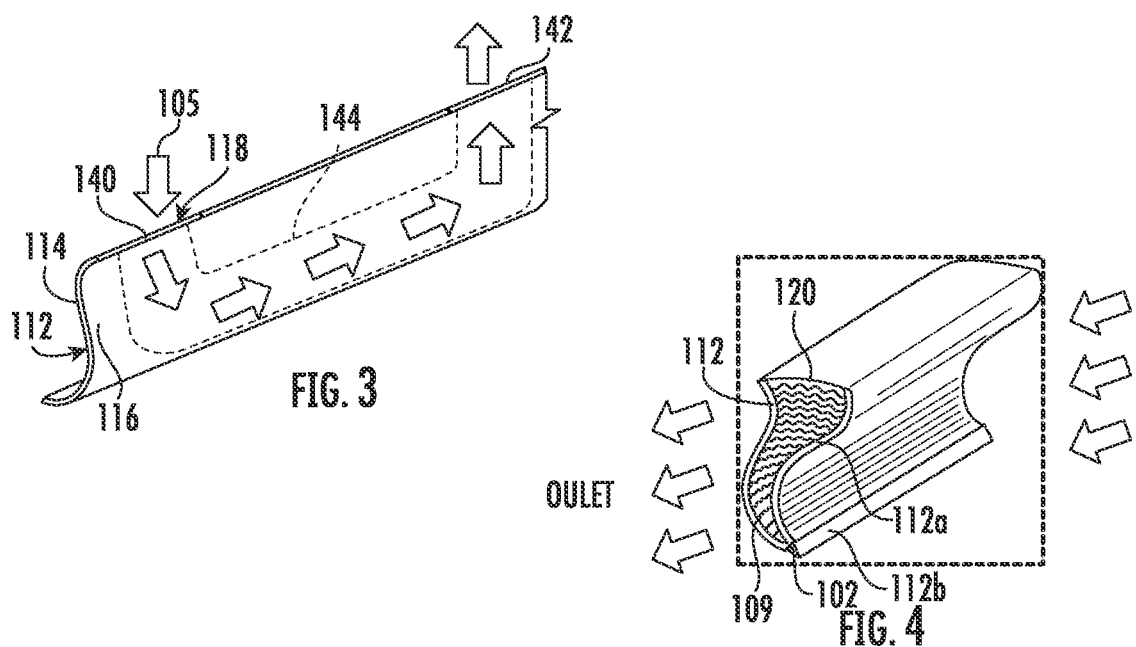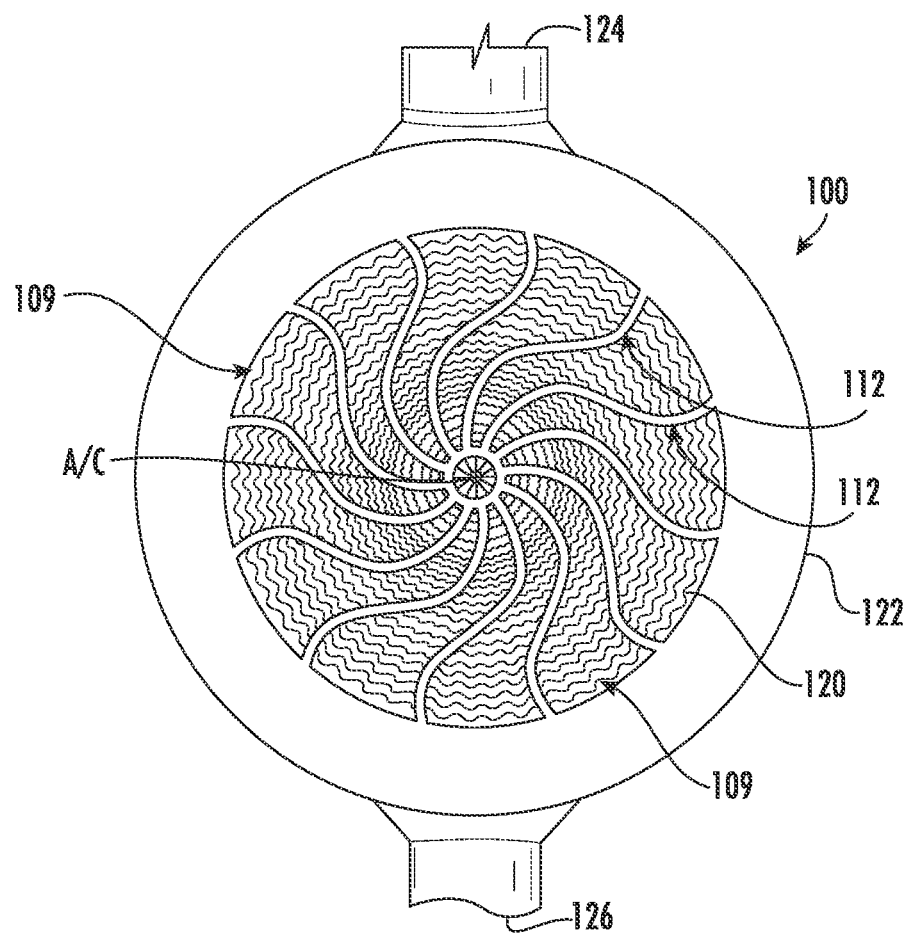

HEAT EXCHANGERS

CROSS-REFERENCE TO RELATED APPLICATIONS

This application is a continuation-in-part of U.S. patent application Ser. No. 17/176,145, filed on Feb. 15, 2021, which is a continuation of U.S. patent application Ser. No. 16/117,374, now issued as U.S. Pat. No. 10,921,071, which is a divisional application of U.S. patent application Ser. No. 14/993,843 filed Jan. 12, 2016, now issued as U.S. Pat. No. 10,088,250. The contents of each aforementioned application are incorporated by reference herein in their entirety.

BACKGROUND OF THE INVENTION

1. Field of the Invention

The present invention relates to heat exchangers, and, in particular, to a cylindrical counter-flow heat exchanger.

2. Description of Related Art

Heat exchangers are used in a variety of systems, for example, in engine and environmental control systems of aircraft. These systems tend to require continual improvement in heat transfer performance, reductions in pressure loss, and reductions in size and weight. Heat exchangers typically include a plate/fin construction in the core of the heat exchanger.

Such conventional methods and systems have generally been considered satisfactory for their intended purpose. However, there is still a need in the art for systems and methods that allow for improved heat exchangers. The present invention provides a solution for these problems.

SUMMARY OF THE INVENTION

A counter-flow heat exchanger core includes a first wall defining a longitudinal axis. The first flow path is defined within the first wall. The first flow path includes a primary flow inlet and a primary flow outlet downstream from the primary flow inlet. The heat exchanger core includes at least two hollow vanes circumferentially spaced apart and extending in a radially inward direction from the first wall. Each of the at least two hollow vanes includes a first vane wall and a second vane wall. The heat exchanger core includes a second flow path defined within the at least two hollow vanes between the first vane wall and second vane wall of each of the at least two hollow vanes. The heat exchanger core includes at least one fin extending between two of the at least two hollow vanes.

In some embodiments, the at least one fin is a non-linear fin. The at least one fin can be a wavy fin. The at least one fin can be a portion of a cylindrical wall. The heat exchanger core can include a second wall radially inward from the first wall. The at least one non-linear fin can include a plurality of non-linear fins between two of the hollow vanes. Each of the plurality of non-linear fins can be equally spaced apart from adjacent fins in a radial direction. The at least one non-linear fin can include a plurality of non-linear fins between two of the hollow vanes. The plurality of non-linear fins can be variably spaced apart in a radial direction to the first wall. The non-linear fins more proximate to the longitudinal axis can be spaced farther apart from one another than the non-linear fins more proximate to the first wall.

The heat exchanger core can include a housing wall radially outward from the first wall. The housing wall can define a second flow path inlet and a second flow path outlet. The second flow path outlet can be downstream from the second flow path inlet. A fluid distributor inlet annulus can be defined between the first wall and the housing wall. The fluid distributor inlet annulus can be in fluid communication with the second flow path of each of the hollow vanes. A fluid distributor outlet annulus can be defined between the first wall and the housing wall downstream from the fluid distributor inlet annulus and the circumferentially spaced apart hollow vane. The second flow path outlet can be downstream from the second flow path inlet and the fluid distributor outlet annulus. The second flow path inlet and the second flow path outlet can be spaced apart from one another along the longitudinal axis. The second flow path inlet and a second flow path outlet can be offset from one another by 180 degrees.

In some embodiments, the core includes an inner wall radially inward from the first wall. The first wall can be an outer wall. The at least two hollow vanes can be formed by the inner wall and define channels. The first vane wall can be a first portion of the inner wall and the second vane wall is a second portion of the inner wall. The second flow path can be defined at least partially within the channels. The at least one fin can be a portion of a cylindrical wall between the first vane wall of one of the at least two vanes and the first vane wall of another of the at least two vanes.

In accordance with another aspect, a method of manufacturing a counter-flow heat exchanger core includes forming a heat exchanger core body using additive manufacturing. The heat exchanger core body is similar to that described above. The additive manufacturing can be via selective laser melting and/or direct metal laser sintering.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a perspective view of a schematic cross-sectional depiction of an exemplary embodiment of a counter flow heat exchanger core, showing the heat exchanger core and from the downstream side relative to the primary flow direction;

FIG. 2 is a schematic cross-sectional view of the heat exchanger core of FIG. 1, showing a a second flow path inlet and a second flow path outlet and the secondary flow path therebetween;

FIG. 3 is a schematic perspective view of one of the hollow vanes of the heat exchanger of FIG. 1, schematically showing a portion of the secondary flow path;

FIG. 4 is a schematic perspective view of two of the hollow vanes of the heat exchanger core of FIG. 1, showing the non-linear fins between the hollow vanes;

FIG. 5 is a schematic front plan view of the heat exchanger core of FIG. 1, showing that each of the non-linear fins between two of the hollow vanes are equally spaced from adjacent fins in a radial direction;

DETAILED DESCRIPTION OF THE PREFERRED EMBODIMENTS

Figure 6:
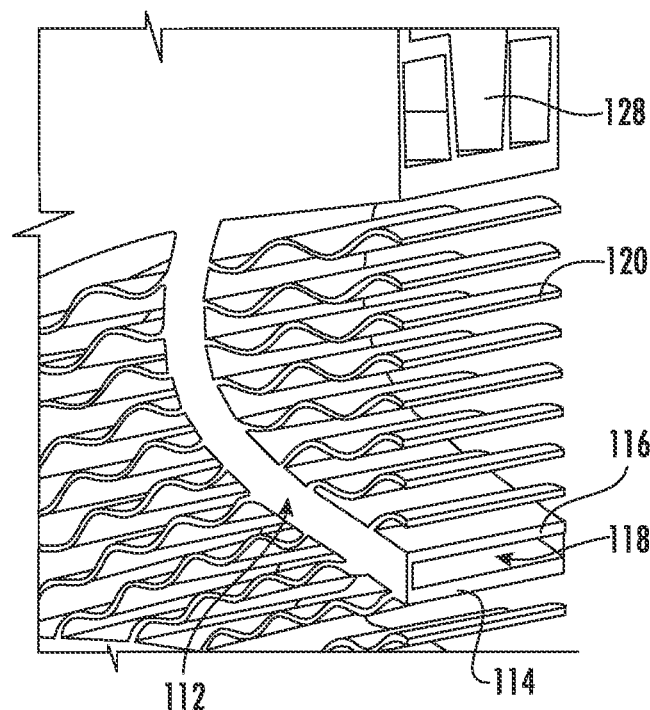
FIG. 6 is a schematic perspective view of the heat exchanger core of FIG. 1, showing the wavy geometry of the non-linear fins.

Reference will now be made to the drawings wherein like reference numerals identify similar structural features or aspects of the subject disclosure. For purposes of explanation and illustration, and not limitation, a perspective view of an exemplary embodiment of a heat exchanger core in accordance with the disclosure is shown in FIG. 1 and is designated generally by reference character 100. Other embodiments of heat exchanger core in accordance with the disclosure, or aspects thereof, are provided in FIGS. 2-13, as will be described. Embodiments of heat exchanger 100 and 300 provide a heat exchanger core that results in increased performance, and reduced size and weight as compared with traditional heat exchangers.

As shown in FIGS. 1-2 and 4, a counter-flow heat exchanger core 100 includes a second wall 102 defining a longitudinal axis A. The counter-flow heat exchanger core 100 is configured and adapted to have oil flow and air flow separated into a counter-flow arrangement. The heat exchanger core 100 includes a first wall 104 radially outward and spaced apart from the second wall 102. The first flow path 106, e.g. the air flow path, includes a primary flow inlet 108 and a primary flow outlet 110 downstream from the primary flow inlet 108. The air flows through primary flow inlet 108 and then through channels 109 to outlet 110. Channels 109 totally fill the air side of the heat exchanger core 100, meaning that they extend the entire length in the longitudinal direction of core 100 from primary flow inlet 108 to primary flow outlet 110 such that there are no header sections within core 100. The arrows 103 schematically show the flow direction of the first flow path 106. The heat exchanger core 100 includes a plurality of circumferentially spaced apart at least partially hollow vanes 112 extending in a radially inward direction from the first wall 104. Each of the hollow vanes 112 includes a first vane wall 114 and a second vane wall 116. Vanes 112 have a wavy cross-sectional profile as they extend radially from second wall 102 to first wall 104, as shown in FIG. 1. Vanes 112 stop at the center C of the first wall. Hollow portions 112a of vanes 112 stop at the second wall 102. From second wall 102 inwards toward center C, the vanes 112 have solid portions 112b. The solid portions 112b of vanes 112 provide increased heat transfer area, similar to fins 120, described below. Those skilled in the art will readily appreciate that in some embodiments second wall 102 is simply formed by the hollow portions of the adjacent circumferentially spaced apart vanes 112 abutting one another, or spaced apart vanes 112 may not abut one another, but do join together at a solid annulus of material.

As shown in FIGS. 4-5, the heat exchanger core 100 includes a plurality of non-linear fins 120, e.g., wavy fins, extending between two of the hollow vanes 112. The wavy air fins 120 provide increased heat transfer area, thereby improving the thermal performance of the entire heat exchanger core 100. The longitudinal component of each wavy air fin 120 extends in a substantially circumferential direction. The wavy circumferentially extending fins 120 have negligible influence on pressure loss, making them more desirable. Each of the plurality of non-linear fins 120 are equally spaced apart from adjacent fins 120 in a radial direction. The wavy air fins 120 will reduce thermal stresses on core 100 and its components when thermal expansion scenarios occur by easing expansion. For example, as the heat exchanger core 100 heats up vanes 112, second wall 102, and/or first wall 104 may expand. The wavy fins are more flexible, thereby providing easier expansion during these scenarios.

With reference now to FIGS. 1-6, the heat exchanger core 100 includes a housing wall 122 radially outward from the first wall 104. The housing wall 122 defines a second flow path inlet 124 and a second flow path outlet 126. The second flow path outlet 126 is downstream from the second flow path inlet 124. The heat exchanger core 100 includes a second flow path 118 defined between the second flow path inlet 124 and the second flow path outlet 126. Oil enters to the heat exchanger by inlet 124. Each vane 112 defines an inlet 140, e.g. an oil inlet, an outlet 142, e.g. an oil outlet, and a flow channel 144 therebetween. Flow channel 144 defines an axial component of second flow path 118 along longitudinal axis A opposite to the flow direction of the first flow path 106. The second flow path 118 flows within the hollow vanes 112 from oil inlet 140 to oil outlet 142 between the first vane wall 114 and second vane wall 116 of each of the hollow vanes 112. The general flow direction of the second flow path 118 is schematically shown by arrows 105. The channels 109 of the first flow path 106 are concentrically arranged between the outer surfaces of adjacent vanes 112 and wavy air fins 120.

As shown in FIGS. 1-3 and 6, a fluid distributor inlet annulus 128 is defined between the first wall 104 and the housing wall 122. The fluid distributor inlet annulus 128 is in fluid communication with the second flow path 118 of each of the hollow vanes 112. The heat exchanger core 100 includes a distribution tank 123 on one side of the inlet annulus 128 downstream from the inlet 124. Once oil enters at second flow path inlet 124, the oil fills the distribution tank 123 and then goes through the oil channel inlets 140 of each vane 112 into each flow channel 144.

With continued reference to FIGS. 1-3 and 6, a fluid distributor outlet 130 is defined in the first wall 104 and the housing wall 122 downstream from the fluid distributor inlet annulus 128 and the circumferentially spaced apart hollow vane 112. The second flow path outlet 126 is downstream from the second flow path inlet 124 and the fluid distributor outlet annulus 130. The heat exchanger core 100 includes a collecting tank 125 on one side of the fluid distributor outlet annulus 130 upstream from the second flow path outlet 126. Oil goes through the flow channels 144 and out the respective outlets 142 of each vane 112 and then accumulates via fluid distributor outlet annulus 130 in the collecting tank 125 and then out the second flow path outlet 126. The second flow path inlet 124 and the second flow path outlet 126 are spaced apart from one another along the longitudinal axis A. The second flow path inlet 124 and a second flow path outlet 126 are offset from one another by 180 degrees.

Figure 7:
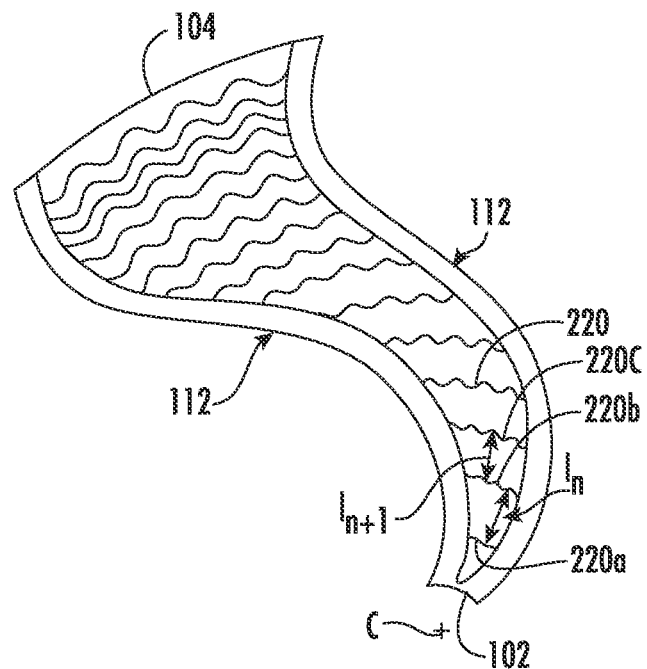
FIG. 7 is a schematic front plan view of another embodiment of the non-linear fins for the heat exchanger core of FIG. 1, showing the non-linear fins between two of the hollow vanes non-equally spaced from adjacent fins in a radial direction.

As shown in FIG. 7, another embodiment of the non-linear fins 220 is shown. In the embodiment of FIG. 7, non-linear fins 220 more proximate to the center C are spaced farther apart from one another than the non-linear fins 220 more proximate to the first wall 104. This is different from the constant spacing between fins 120 of FIGS. 1-6. The spacing in FIG. 7 is to keep the hydraulic diameter ($l_n$) between the non-linear fins 220 constant, which makes the actual distance between fins 220, in the radial direction, vary. In some embodiments, the hydraulic diameter ($l_{n+1}$) between two of the fins, 220b and 220c, is based on the hydraulic diameter ($l_n$) between the previous two fins, 220a and 220b. For example, the hydraulic diameter between fins 220b and 220c can be calculated using the following equation: $l_{n+1}=l_n \times 0.97$, where $l_n$ is the hydraulic diameter between the previous two fins, 220a and 220b. Those skilled in the art will readily appreciate that the equation above is an exemplary relationship and may be different depending on the circumstances, e.g., depending on material stiffness or other fluid parameters. The non-linear fins 220 are variably spaced apart in a radial direction from center C to the first wall 104. This generally results in the non-linear fins 220 being further apart from one another when they are nearer to the center C and longitudinal axis A and closer to one another when they are closer to first wall 104.

By utilizing a counter-flow configuration, heat exchanger core 100 provides for reduced size and increased performance by better balancing the hot and cold fluids running through core 100, e.g. through first and second flow paths 106 and 118, respectively. Heat exchanger 100 also increases the heat exchanger effectiveness for a given overall heat transfer area. The counter-flow configuration enables high temperature and high pressure operation by reducing the temperature differential across the heat exchanger planform since the cold side outlet and hot side inlet are aligned with one another.

It is contemplated that a method of manufacturing a counter-flow heat exchanger core, e.g. heat exchanger core 100, includes forming heat exchanger core 100 using additive manufacturing such as, selective laser melting (SLM), for example. It is contemplated that powder bed fusion processes can be used (e.g. direct metal laser sintering (DMLS), electron beam melting, selective heat sintering, or the like), or other categories of additive manufacturing can also be used. It is contemplated that the heat exchanger core can be manufactured in the flow direction, e.g. along longitudinal axis A to avoid horizontal surfaces. Heat exchanger core 100 can be manufactured as a single piece, e.g. without any brazing or weld joints.

Figure 8:
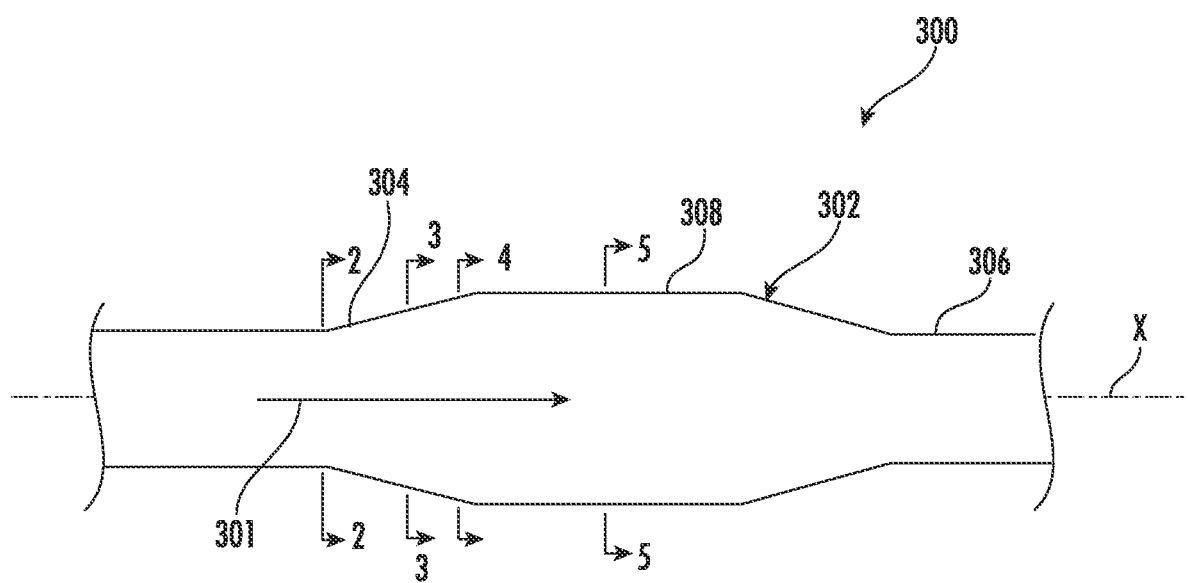
FIG. 8 is a top view of a schematic depiction of another exemplary embodiment of a counter flow heat exchanger, showing the heat exchanger core and the primary flow direction.

As shown in FIG. 8, another embodiment of a counter-flow heat exchanger 300 includes a heat exchanger core 302 that defines a longitudinal axis X. Heat exchanger core 302 includes a primary flow inlet 304, a primary flow outlet 306 and a middle portion 308 therebetween. The primary flow direction is indicated schematically by the arrow 301. Heat exchanger core 302 is circular cylinder that includes conical tapering portions at its inlet and outlet, 304 and 306, respectively. A diameter of heat exchanger core 302 at primary flow inlet 304 is smaller than a diameter of the heat exchanger core 302 in middle portion 308. It is also contemplated that the diameter of core 302 at inlet 304 and in middle portion 308 can be the same, e.g. core 302 can have a constant diameter. Heat exchanger core 302 has circular cross-sections along its length, e.g. those taken perpendicular to the flow direction and longitudinal axis X. It is contemplated that heat exchanger core 302 can have a variety of other suitable shapes, for example, it can be an oval cylinder, an elliptical cylinder, a rectangular cylinder, or a square cylinder. In accordance with some embodiments, additional elliptically shaped walls, similar to additional walls 330 can be used inside a rectangular cylinder core. The heat exchanger core is substantially linear and defines a longitudinal axis between the primary flow inlet and the primary flow outlet. A radial center of the second wall is aligned with the longitudinal axis.

Figure 9:
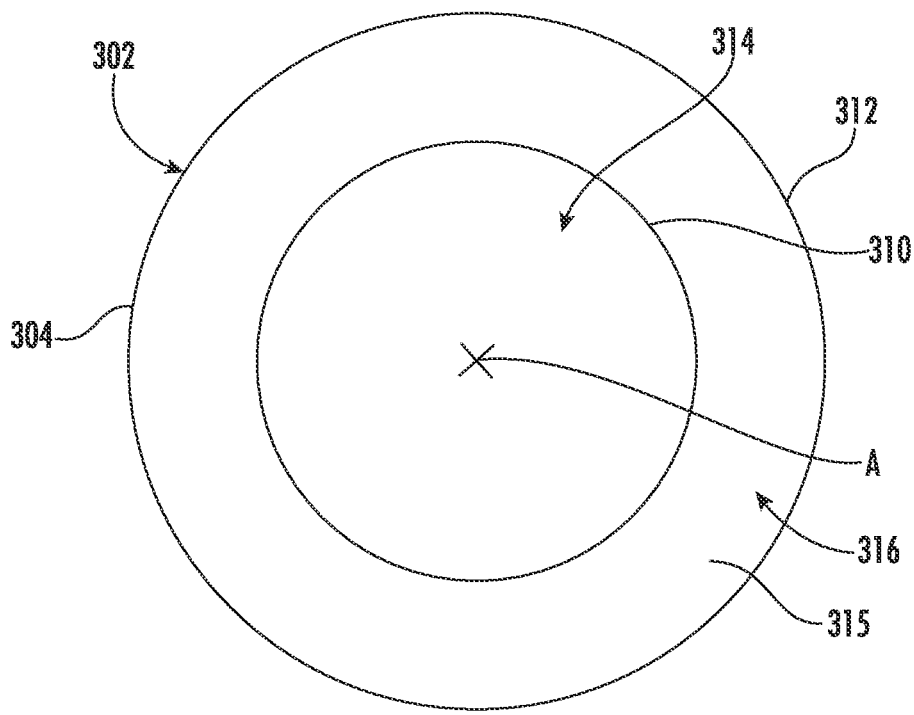
FIG. 9 is a schematic cross-sectional view of the heat exchanger of FIG. 8 at the primary flow inlet of the heat exchanger core, showing second and first walls and an annulus formed therebetween.

As shown in FIG. 9, a cross-section of heat exchanger core 302 at primary flow inlet 304 is shown. At primary flow inlet 304, heat exchanger core 302 includes an inner wall 310, e.g. a second wall, and an outer wall 312, e.g. a first wall, radially outward and spaced apart from inner wall 310. A first flow path 314 is defined within inner wall 310 and outer wall 312 and a second flow path 316 is defined between inner wall 310 and outer wall 312. Inner and outer walls, 310 and 312, respectively, define an annulus 315 that includes second flow path 316. Inner and outer walls 310 and 312, respectively, are cylindrical and concentric at primary flow inlet 304 of heat exchanger core 302. Inner and outer walls, 310 and 312, respectively, are concentric at primary flow outlet of the heat exchanger core.

Figure 10:
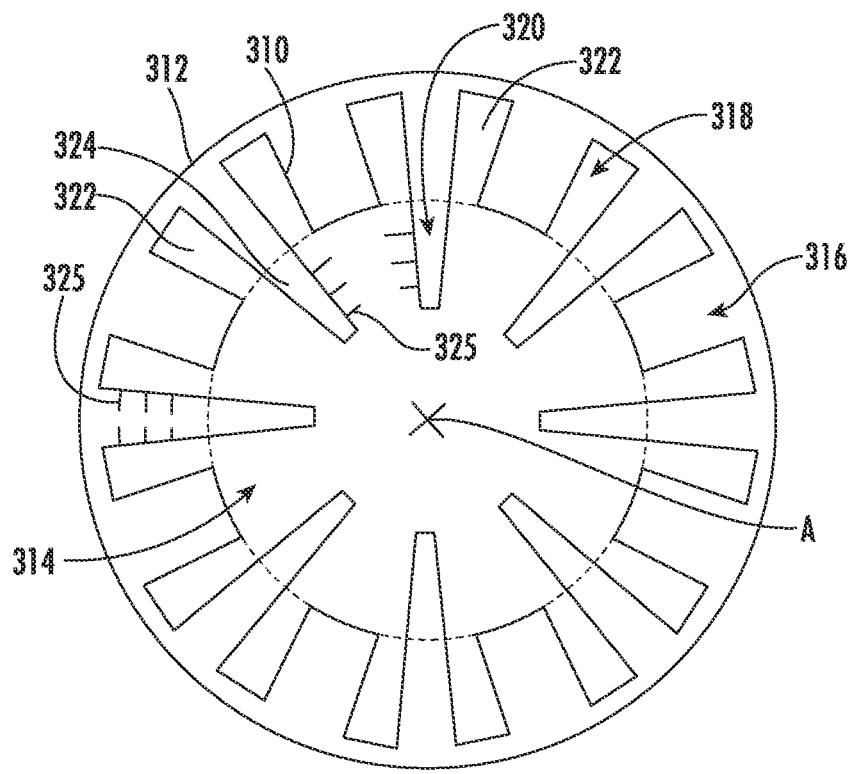
FIG. 10 is a schematic cross-sectional view of the heat exchanger of FIG. 8 between the primary flow inlet of the heat exchanger core and a middle portion of the heat exchanger core, showing the converging and diverging sets of channels.

As shown in FIG. 10, as inner wall 310 extends away from primary flow inlet 304 it becomes corrugated and defines a first set of channels 318 extending axially from primary flow inlet 304 to middle portion 308 of heat exchanger core 302 diverging away from a radial center A of heat exchanger core 302. Inner wall 310 and outer wall 312 define a second set of channels 320, e.g. channels defined between first and second vane walls, extending axially from primary flow inlet 304 to middle portion 308 of heat exchanger core 302 converging toward radial center A of heat exchanger core 302. Respective channels 322 and 324 of the first and second sets of channels 318 and 320, respectively, alternate circumferentially with one another to provide additional surface area for heat transfer. In accordance with the embodiment of FIG. 10, two channels 322 from first set of channels 318 alternate with one channel 324 from second set of channels 320. First and second flow paths 314 and 316, respectively, include vanes 325 to assist with flow distribution with only minimal pressure drop.

Figure 11:
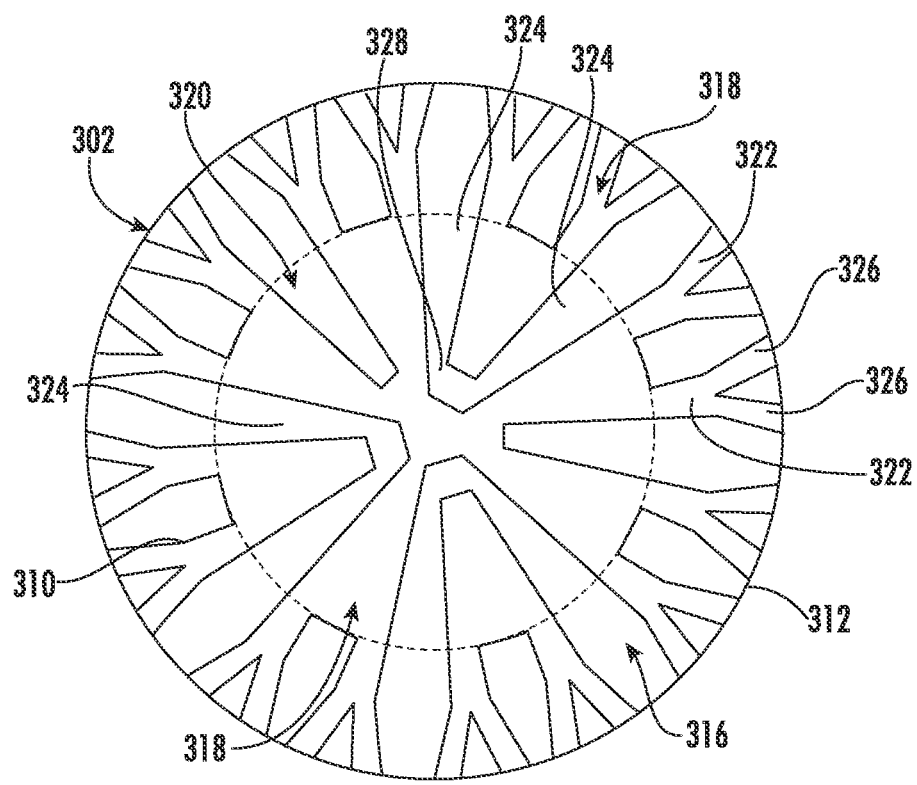
FIG. 11 is a schematic cross-sectional view of the heat exchanger of FIG. 8 between the primary flow inlet of the heat exchanger core and a middle portion of the heat exchanger core, showing the channels of the first set of channels separating into sub-channels.

With reference now to FIG. 11, as inner wall 310 extends further axially away from flow inlet 304 toward and into middle portion 308, channels 322 of the first set of channels 318 split into multiple sub-channels 326 to maintain a width smaller than a maximum threshold. At least two channels 324 of the second set of channels 320 unite into a single joined channel 328 to maintain a width greater than a minimum threshold.

Figure 12:
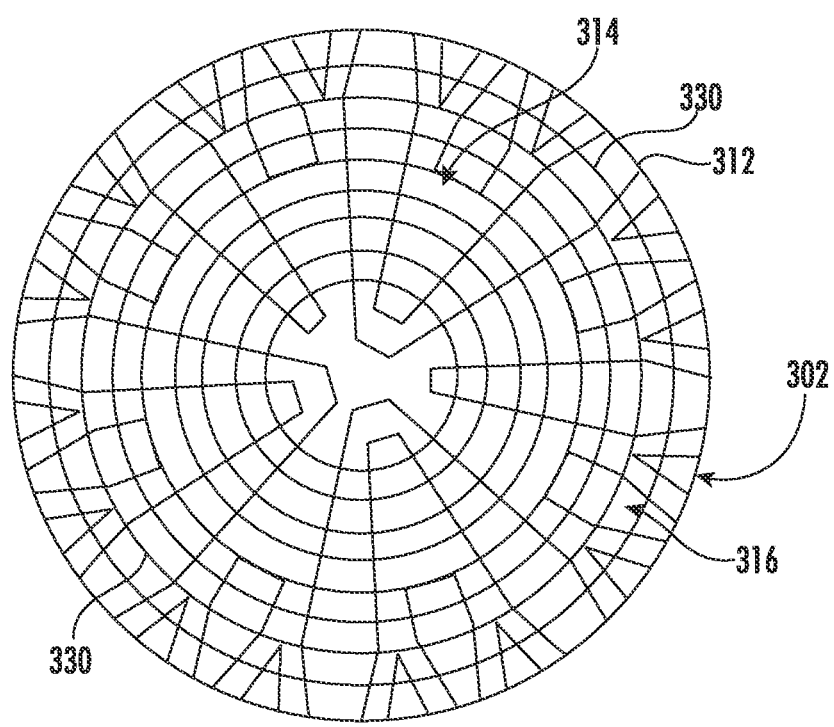
FIG. 12 is a schematic cross-sectional view of the heat exchanger of FIG. 8 in the middle portion of the heat exchanger core, showing the additional cylindrical walls.

As shown in FIG. 12, additional cylindrical walls 330, e.g. fins, are disposed radially inward from outer wall 312 and are concentric with heat exchanger core 302. Additional cylindrical walls 330 are radially spaced apart from one another and are in fluid communication with first and second flow paths 314 and 316, respectively. Additional cylindrical walls 330 are circular cylindrical walls. Additional cylindrical walls 330 are disposed in middle portion 308 of the heat exchanger core 302. It is also contemplated that additional cylindrical walls like cylindrical walls 330 could be used in other portions of heat exchanger core 302.

Figure 13:
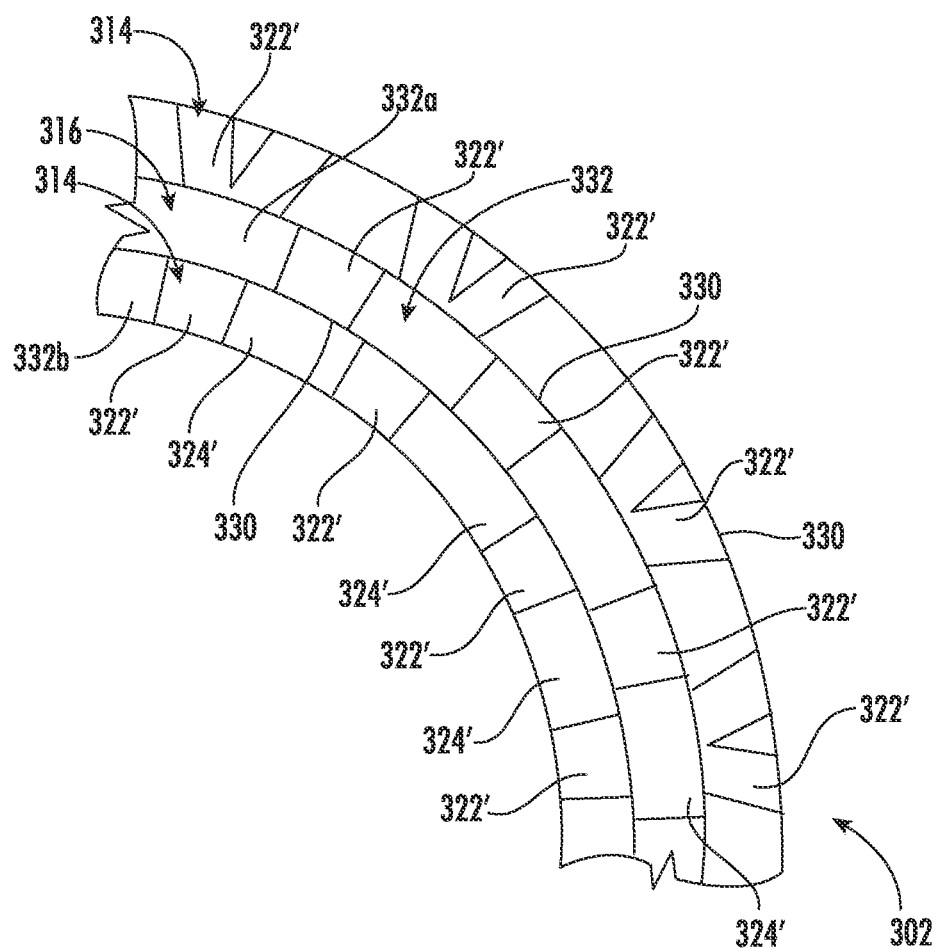
FIG. 13 is a schematic cross-sectional view of a portion of the heat exchanger of FIG. 8 in the middle portion of the heat exchanger core, showing adjacent annular sections between the additional cylindrical walls off-set from one another.

As shown in FIG. 13, in accordance with an embodiment of core 302, annular ring sections 332 are defined between two adjacent additional walls 330 are circumferentially offset with respect to an adjacent annular ring so that a checker-board pattern is formed, e.g. alternating first and second flow paths 314 and 316, respectively, in a radial direction as well as in a circumferential direction. The cross-section of FIG. 13 is taken at a similar location as the cross-section of FIG. 12. Each annular ring section 332 includes a portion 322' of one of channels 322 from first set of channels 318 and a portion 324' of one of channels 324 from second set of channels 320. Portion 322' from first set of channels 318 in a first annular ring section 332a is offset radially and circumferentially from portion 322' from first set of channels 318 in a second annular ring 332b section. Second annular ring section 332b is adjacent to first annular ring section 332a. Portion 324' from the second set of channels 320 in first annular ring section 332a is offset radially and circumferentially from portion 324' from second set of channels 320 in second annular ring section 332b.

With reference now to FIGS. 8-12, at outlet 306 of the heat exchanger core 302 inner and outer walls 310, and 312, respectively, are similar to how they were arranged at inlet 304, shown in FIG. 9, e.g. at a cross-section taken perpendicular to longitudinal axis X at outlet 306 inner and outer walls 310, and 312, respectively, would be concentric circles. To transition back to concentric circles, from middle portion 308 of the heat exchanger core 302 to primary flow outlet 306, the first set of channels 318 extends axially away from middle portion 308 to the primary flow outlet 306 converging back toward radial center A of heat exchanger core 302 and second set of channels 320 extends axially away from middle portion 308 to primary flow outlet 306 diverging away from radial center A of the heat exchanger core. By utilizing a counter-flow configuration, heat exchanger 300 provides for reduced size and increased performance by better balancing the hot and cold fluids running through core 302, e.g. through first and second flow paths 314 and 316, respectively. Heat exchanger 300 also increases the heat exchanger effectiveness for a given overall heat transfer area. The counter-flow configuration enables high temperature and high pressure operation by reducing the temperature differential across the heat exchanger planform since the cold side outlet and hot side inlet are aligned with one another. By gradually transitioning from the inlet 304, as shown in FIG. 9, to the core 308, as shown in FIG. 12, pressure drops can be reduced and there is not a large discontinuity in stiffness or thermal response as in traditional headering.

It is contemplated that a method of manufacturing a counter-flow heat exchanger core, e.g. heat exchanger core 302, includes forming heat exchanger core 302 using additive manufacturing such as, SLM or DMLS, for example. It is contemplated that the heat exchanger core can be manufactured in the flow direction, e.g. along longitudinal axis X to avoid horizontal surfaces. It is also contemplated that instead of being a linearly extending cylinder, the heat exchanger could be built along a sinusoidal path creating wavy or ruffled sets of channels as opposed to straight ones for increased heat transfer or bend around obstructions.

The methods and systems of the present disclosure, as described above and shown in the drawings, provide for heat exchangers with superior properties including improved heat transfer resulting from a larger primary flow area, with a relatively small amount of secondary flow area. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A counter-flow heat exchanger core comprising:
   a first wall defining a longitudinal axis;
   a first flow path defined within the first wall, wherein the first flow path includes a primary flow inlet and a primary flow outlet downstream from the primary flow inlet;
   at least two hollow vanes circumferentially spaced apart and extending in a radially inward direction from the first wall, wherein each of the at least two hollow vanes includes a first vane wall and a second vane wall;
   a second flow path defined within the at least two hollow vanes between the first vane wall and second vane wall of each of the at least two hollow vanes; and
   at least one fin extending between two of the at least two hollow vanes.

2. The counter-flow heat exchanger core as recited in claim 1, wherein the at least one fin is at least one of a non-linear fin or a portion of a cylindrical wall.

3. The counter-flow heat exchanger core as recited in claim 1, further comprising a second wall radially inward from the first wall.

4. The counter-flow heat exchanger core as recited in claim 1, wherein the at least one non-linear fin includes a plurality of non-linear fins between two of the hollow vanes, wherein each of the plurality of non-linear fins are equally spaced apart from adjacent fins in a radial direction.

5. The counter-flow heat exchanger core as recited in claim 1, wherein the at least one non-linear fin includes a plurality of non-linear fins between two of the hollow vanes, wherein the plurality of non-linear fins are variably spaced apart in a radial direction to the first wall.

6. The counter-flow heat exchanger core as recited in claim 5, wherein the non-linear fins more proximate to the longitudinal axis are spaced farther apart from one another than the non-linear fins more proximate to the first wall.

7. The counter-flow heat exchanger core as recited in claim 1, wherein the heat exchanger core includes a housing wall radially outward from the first wall.

8. The counter-flow heat exchanger core as recited in claim 7, wherein the housing wall defines a second flow path inlet and a second flow path outlet, wherein the second flow path outlet is downstream from the second flow path inlet.

9. The counter-flow heat exchanger core as recited in claim 7, wherein a fluid distributor inlet annulus is defined between the first wall and the housing wall.

10. The counter-flow heat exchanger core as recited in claim 9, wherein the fluid distributor inlet annulus is in fluid communication with the second flow path of each of the hollow vanes.

11. The counter-flow heat exchanger core as recited in claim 9, wherein a fluid distributor outlet annulus is defined between the first wall and the housing wall downstream from the fluid distributor inlet annulus and the circumferentially spaced apart hollow vane.

12. The counter-flow heat exchanger core as recited in claim 11, wherein the housing wall defines a second flow path inlet and a second flow path outlet, wherein the second flow path outlet is downstream from the second flow path inlet and the fluid distributor outlet annulus.

13. The counter-flow heat exchanger core as recited in claim 7, wherein the housing wall defines a second flow path inlet and a second flow path outlet, wherein the second flow path outlet is downstream from the second flow path inlet, wherein the second flow path inlet and the second flow path outlet are spaced apart from one another along the longitudinal axis.

14. The counter-flow heat exchanger core as recited in claim 13, wherein the second flow path inlet and a second flow path outlet are offset from one another by 180 degrees.

15. The counter-flow heat exchanger core as recited in claim 1, further comprising an inner wall radially inward from the first wall, wherein the first wall is an outer wall, wherein the at least two hollow vanes are formed by the inner wall and define channels, wherein the first vane wall is a first portion of the inner wall and the second vane wall is a second portion of the inner wall, wherein the second flow path is defined at least partially within the channels.

16. The counter-flow heat exchanger core as recited in claim 15, wherein the at least one fin is a portion of a cylindrical wall between the first vane wall of one of the at least two vanes and the first vane wall of another of the at least two vanes.

17. A method of manufacturing a counter-flow heat exchanger core, the method comprising:
   forming a heat exchanger core body using additive manufacturing, wherein the heat exchanger core body includes:
   a first wall defining a longitudinal axis;
   a first flow path defined within the first wall, wherein the first flow path includes a primary flow inlet and a primary flow outlet downstream from the primary flow inlet;
   at least two hollow vanes circumferentially spaced apart and extending in a radially inward direction from the first wall, wherein each of the at least two hollow vanes includes a first vane wall and a second vane wall;
   a second flow path defined within the at least two hollow vanes between the first vane wall and second vane wall of each of the at least two hollow vanes; and
   at least one fin extending between two of the at least two hollow vanes.

18. The method as recited in claim 17, wherein the at least one fin is at least one of a non-linear fin or a portion of a cylindrical wall.

19. The method as recited in claim 17, wherein the additive manufacturing is via selective laser melting.

* * * * *